United States Patent [19]

Sisk et al.

[11] 4,137,798

[45] Feb. 6, 1979

[54] TWO-SPEED DRIVE APPARATUS

[75] Inventors: Francis J. Sisk, Apollo; Thomas J. Fagan, Pittsburgh, both of Pa.

[73] Assignee: Electric Power Research Institute, Inc., Palo Alto, Calif.

[21] Appl. No.: 772,176

[22] Filed: Feb. 25, 1977

[51] Int. Cl.² .................... F16H 5/52; F16H 57/10; B60K 41/24

[52] U.S. Cl. .................... 74/812; 74/789; 192/12 B

[58] Field of Search .................... 74/812, 789, 750 R; 192/12 B, 12 BA

[56] References Cited

U.S. PATENT DOCUMENTS

| | | | |
|---|---|---|---|
| 1,268,350 | 6/1918 | Henry | 74/750 R |
| 2,467,627 | 4/1949 | Olson | 74/812 X |
| 2,588,187 | 3/1952 | Weiser | 74/812 X |
| 3,581,854 | 6/1971 | Versoy | 192/12 B |

FOREIGN PATENT DOCUMENTS 777259  2/1935  France ........................ 74/789
1033697 7/1953 France ........................ 74/789

Primary Examiner—Lance W. Chandler
Attorney, Agent, or Firm—Townsend and Townsend

[57] ABSTRACT

Apparatus for rotating a driven shaft in the same direction at two different speeds upon rotation of a drive shaft in respective, opposed directions. The apparatus includes a sun gear on the drive shaft, a ring gear on the driven shaft, a planet carrier rotatably mounted on the drive shaft, adjacent to the sun gear, one or more planetary gears rotatably mounted on the planet carrier and in mesh with the sun and ring gears. An over-running clutch locks the planet carrier to the drive shaft when the latter rotates in one direction to thereby lock the planetary gears to the sun and ring gears to cause rotation of the ring gear and the driven shaft in a first direction at a first speed. A sprag prevents rotation of the planet carrier relative to a fixed support when the drive shaft rotates in the opposite direction to thereby allow rotation of the planetary gears about fixed axes to rotate the ring gear and thereby the driven shaft in the first direction at a second speed.

1 Claim, 3 Drawing Figures

U.S. Patent      Feb. 6, 1979      4,137,798
FIG. 1
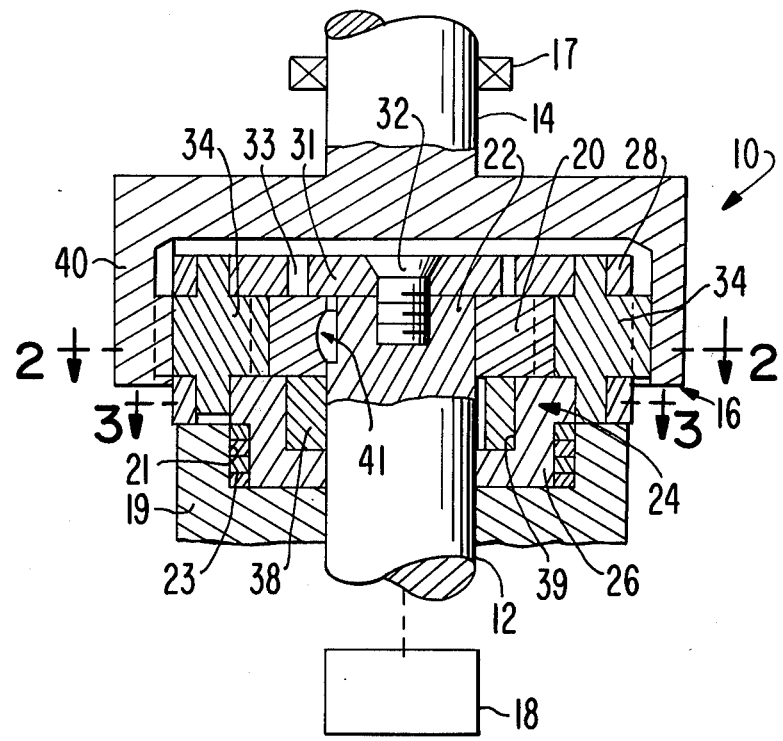
FIG. 2
FIG. 3
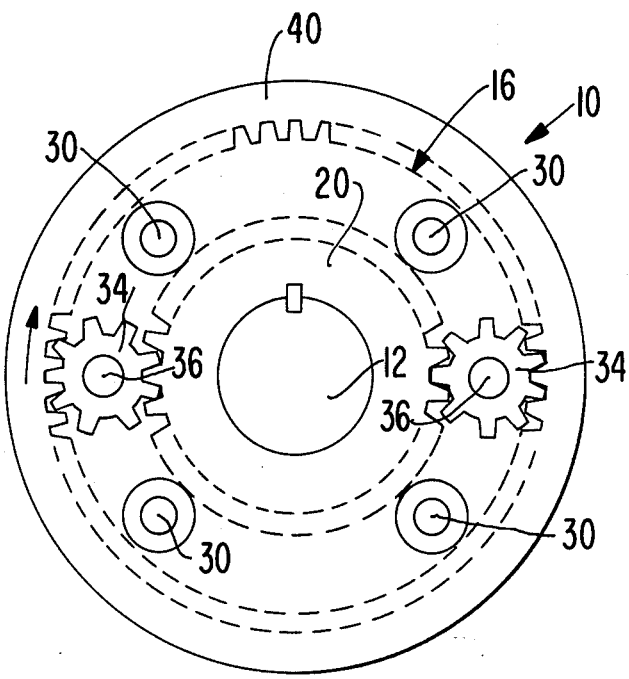

TWO-SPEED DRIVE APPARATUS

This invention was made under contract with or supported by the Electric Power Research Institute, Inc.

This invention relates to improvements in variable speed mechanical drive mechanisms and, more particularly, to an improved two-speed drive apparatus operated by a reversible motor.

BACKGROUND OF THE INVENTION

In the use of heat pumps, it is extremely desirable that the displacement of the compressor of such a heat pump be reduced to optimize the heat pump annual performance factor in the Northern Hemisphere. This desired advantage follows from the conflict between needed reduction in capacity balance temperature (heating) to avoid excessive use of resistance heat on the one hand avoiding excessive loading of heat exchangers with excess capacity in mild day heating and summer cooling operations.

Conventional two-speed motors are limited to 50% capacity reduction which, due to evaporator-compressor capacity feedback effects, provides insufficient capacity control with a considerable cost penalty in using such a two-speed motor. A need has, therefore, arisen for improved drive apparatus for achieving the aforesaid advantage without the expense involved in the use of conventional two-speed motors.

SUMMARY OF THE INVENTION

The present invention provides an improved drive apparatus which meets the aforesaid need when the apparatus is usable with a standard reversible motor in such a way that a driven shaft, such as the shaft of a heat pump compressor, can be driven at two different speeds in the same direction merely by rotating the drive shaft of the reversible motor in opposed directions. Thus, when the drive apparatus of this invention is used with a heat pump compressor, the compressor displacement can be reduced to optimize the performance factor of the heat pump while avoiding excessive loading in mild day heating or summer cooling operation.

To achieve the foregoing aim, the present invention utilizes gear means interconnecting the drive and driven shafts, such gear means including a sun gear on the drive shaft, a ring gear on the driven shaft, and one or more planetary gears coupling the sun and ring gears together. Each planetary gear is carried by a planet carrier rotatably mounted on a drive shaft. An overrunning clutch between the planet carrier and the drive shaft locks these two elements together when the drive shaft rotates in one direction. This, in effect, locks the sun, ring and planetary gears together to cause the driven shaft to rotate in a first direction at a first speed, i.e., the speed of rotation of the drive shaft.

A sprag locks the planet carrier to a fixed support when the drive shaft rotates in the opposite direction, thereby preventing rotation of the planetary gears about the axis of the drive shaft but allowing rotation of the planetary gears relative to their own axes. This causes the ring gear and thereby the driven shaft to rotate in the first direction at a second speed determined by the ratio of the teeth on the sun and ring gears.

The present invention provides a simple and rugged construction and one which can readily be coupled between the drive and driven shafts. It is suitable for a wide variety of applications and is minimal in cost and easy to maintain.

The primary object of this invention is to provide an improved drive apparatus for interconnecting a drive shaft and a driven shaft wherein the driven shaft can be rotated in the same direction at two different speeds by rotating the drive shaft in respective opposed directions to thereby permit maximum control of the driven shaft without a complex structure interconnecting the shafts.

Another object of this invention is to provide a drive apparatus of the type described wherein sun, ring and planetary gears are used to interconnect the two shafts with the planetary gear locking the sun and ring gears together when the drive shaft rotates in one direction and the planetary gear rotatably connecting the sun and ring gears when the drive shaft rotates in the opposite direction to thereby provide a connection between the shafts which is simple and rugged in construction, is inexpensive to produce and maintain, yet it allows rotation of the driven shaft in the same direction at two different speeds by operation of a conventional reversible motor.

Still another object of this invention is to provide a drive system including the drive and driven shafts, a reversible motor coupled to the drive shaft, and means of the type described for interconnecting the shafts to thereby provide a construction which can be used in many applications to provide two-speed control of a work-producing device while providing a simple construction and one which is inexpensive to produce and maintain.

Other objects of this invention will become apparent as the following specification progresses, reference being had to the accompanying drawings for an illustration of the invention.

In the drawings:

FIG. 1 is a fragmentary, cross-sectional view of the two-speed drive of this invention;

FIG. 2 is a cross-sectional view taken along line 2—2 of FIG. 1; and

FIG. 3 is a cross-sectional view taken along line 3—3 of FIG. 1.

The two-speed drive apparatus of this invention is broadly denoted by the numeral 10 and includes a drive shaft 12, a driven shaft 14 coaxial with drive shaft 12, and means 16 for interconnecting the two shafts. Shaft 12 is coupled to a reversible motor 18 so that it can rotate in opposed directions. A fixed support 19, which can be a stator forming a part of motor 18 and relative to which drive shaft 12 is rotatable, has an end recess 21 near an end 22 of drive shaft 12. Driven shaft 14, for purposes of illustration, is the shaft of a heat pump compressor and is rotatably mounted by bearing means 17.

Means 16 comprises a sun gear 20 which is rigidly secured in any suitable manner to end 22 of drive shaft 12. Sun gear 20 is concentric with the axis of rotation of drive shaft 12.

A planet carrier 24 is rotatably mounted on end 22 of shaft 12 and includes an inner part 26 and an outer part 28, parts 26 and 28 being rigidly interconnected by a number of rivets 30 and part 26 being rotatably received within recess 21 of support 19. A sprag 23 is disposed between the circular outer surface of part 26 and the circular inner surface of the recess to limit the rotation of part 26 and thereby planet carrier 24 to rotation in a clockwise sense relative to support 19 when viewing FIGS. 2 and 3.

For purposes of illustration, there are four rivets 30 at uniformly spaced positions about the axis of shaft 12. Any suitable means can be provided to mount sun gear 20 to shaft 12, such as member 31, screw 32 and key 41, while planet carrier 24 is restrained in end motion by the clearance between its parts 26 and 28 and the cheeks of sun gear 20. Member 31 is rigidly secured to end 22 of shaft 12 in any suitable manner, such as by a screw 32.

A pair of planetary gears 34 are rotatably mounted by shafts 36 on planet carrier 24 between parts 26 and 28. Planetary gears 34 are diametrically opposed to each other as shown in FIG. 2 and are in mesh with sun gear 20 as shown in FIG. 2. Shafts 36 are journalled in parts 26 and 28.

An over-running clutch 38 is carried by planet carrier 24 in a circular recess 39 (FIGS. 1 and 3) and is coupled to drive shaft 12. Clutch 38 permits rotation of planet carrier 24 in a counterclockwise direction relatively to drive shaft 12 but prevents rotation of carrier 24 in the opposite direction relative to shaft 12.

A ring gear 40 is rigidly secured to driven shaft 14 and is in mesh with planetary gears 34 as shown in FIG. 2. Ring gear 40 is concentric with sun gear 20.

In use, apparatus 10 is operated by energizing motor 18 either in one direction or the other. Assuming that the motor is energized to cause rotation of shaft 12 in a clockwise sense when viewing FIGS. 2 and 3, planet carrier 24 is driven clockwise at low speed until clutch 38 connects planet carrier 24 to drive shaft 12. The planet carrier is then locked to the drive shaft and planetary gears 34 rotate as a unit with sun gear 20 in a clockwise sense when viewing FIGS. 2 and 3. This, in turn, causes rotation of ring gear 40 in a clockwise sense when viewing FIGS. 2 and 3, there being no relative rotation between the sun, planetary and ring gears inasmuch as they are essentially locked together and rotate at the speed of rotation of drive shaft 12. Driven shaft 14 is rotated with ring gear 40 and operates a heat pump compressor or other means coupled thereto.

When shaft 12 is rotated in a counterclockwise direction by reversing motor 18, planet carrier 24 is driven in a counterclockwise sense until sprag 23 locks the planet carrier to support 19. Thus, the planet carrier can no longer rotate in a counterclockwise sense and shafts 36 of planetary gears 34 remain in fixed position although planetary gears 34 rotate relative to shafts 36 in a clockwise sense when viewing FIGS. 2 and 3 under the influence of sun gear 20. This rotation of the planetary gears causes clockwise rotation of ring gear 40 and thereby driven shaft 14 at a speed equal to the motor speed multiplied by the number of teeth on sun gear 20 divided by the number of teeth on ring gear 40. Thus, regardless of which direction drive shaft 12 rotates, driven shaft 14 will always rotate in the same direction. The speed of rotation of the driven shaft will, of course, be greater when shaft 12 rotates in a clockwise sense.

In lieu of connecting clutch 38 between drive shaft 12 and planet carrier 24, an over-running clutch can be used to couple the sun gear and planet carrier. Operation is the same and choice of clutch is a matter of design convenience.

The present invention provides the following advantages over prior art devices:

1. When apparatus 10 is used to drive a heat pump compressor, the speed of rotation of driven shaft 14 can be reduced which, in turn, reduces the mild day (or cooling) peak loading on motor 18 for a given compressor capacity. This decreases the required motor torque and power. Thus, the savings in motor costs may well pay for the gears, clutches and extra bearings of apparatus 10.

2. The ratio of the two operating speeds of apparatus 10 may be made whatever is required to optimize seasonal performance.

3. The motor drive efficiency in the high speed (cold day) mode, is higher than that of either a two-speed motor drive or a conventional single-speed drive since the smaller motor is not underloaded nor is its performance degraded by consequent pole connection.

4. Reliability is not degraded by inaccessible servo-actuators as with standard clutch and brake controlled two-speed gears.

We claim:

1. In a drive apparatus having a reversible motor with a support and a drive shaft rotatable relative to the support, and a driven shaft coaxial with the drive shaft, the improvement comprising: means for coupling the shafts together to permit rotation of the driven shaft in the same direction at two different speeds in response to the rotation of the drive shaft in respective, opposed direction, said means including: a sun gear having means for securing the same to one end of the drive shaft; a ring gear; means coupled with the ring gear for coupling the latter to the driven shaft in surrounding relationship to the sun gear; a planet carrier adapted to be rotatably mounted on said drive shaft at said one end thereof; a pair of planetary gears rotatably mounted on the planet carrier at diametrically spaced locations thereon, said planetary gears being in mesh with said sun and ring gears; an over-running clutch coupled to the planetary carrier and movable into coupled relationship to said drive shaft for preventing rotation of the planetary gears relative to the sun and ring gears when the drive shaft rotates in one direction to thereby lock the gears together to cause the driven shaft to be rotated in a first direction at a first speed; and a sprag coupled to the planet carrier and movable into coupled relationship to the support for permitting rotation of the planetary gears about respective, fixed axes relative to the sun and ring gears when the drive shaft rotates in the opposite direction to thereby cause the driven shaft to rotate in said first direction at a second speed different from said first speed.

* * * * *